United States Patent [19]

Becker et al.

[11] Patent Number: 4,654,810

[45] Date of Patent: Mar. 31, 1987

[54] FACILITY FOR DETERMINING DELAY VARIATIONS

[75] Inventors: Klaus Becker; Albrecht Müller, both of Stuttgart, Fed. Rep. of Germany

[73] Assignee: International Standard Electric Corporation, New York, N.Y.

[21] Appl. No.: 632,557

[22] Filed: Jul. 19, 1984

[30] Foreign Application Priority Data

Jul. 29, 1983 [DE] Fed. Rep. of Germany ....... 3327339

[51] Int. Cl.[4] .......................... G01F 25/00; G01S 7/40
[52] U.S. Cl. ...................................... 364/571; 342/174
[58] Field of Search ....................... 364/444, 451, 571; 343/6.5 R, 7 R, 7.6, 17.7, 7.3; 73/178 R

[56] References Cited

U.S. PATENT DOCUMENTS

| | | | |
|---|---|---|---|
| 3,513,470 | 5/1970 | Rabow | 343/17.7 |
| 4,099,240 | 7/1978 | Rode et al. | 364/571 |
| 4,138,678 | 2/1979 | Kirner | 343/17.7 |
| 4,303,983 | 12/1981 | Chaborski | 364/571 |
| 4,364,027 | 12/1982 | Murooka | 364/571 |
| 4,494,118 | 1/1985 | Graves | 343/17.7 |
| 4,532,516 | 7/1985 | Frampton et al. | 343/17.7 |

FOREIGN PATENT DOCUMENTS 2413995 11/1975 Fed. Rep. of Germany.

OTHER PUBLICATIONS

IBM Tech. Disc. Bulletin; vol. 21, No. 2 (Jul. 1978); "Automatic Transponder Calibration in DME Ranging Systems", D. R. Prunty, pp. 546–551.

Primary Examiner—Errol A. Krass
Assistant Examiner—Kevin J. Teska
Attorney, Agent, or Firm—John T. O'Halloran; Robert P. Seitter

[57] ABSTRACT

The time required for several calibration signals to traverse a signal path (1, 2, 3) is determined and compared with a nominal value. The individual calibration signals have different values for at least one signal parameter. Depending on the results of the comparison, a control signal is produced for each value of the signal parameter. Of the intelligence signal, the value of the signal parameter to be taken into account in the determination of the control signal is measured prior to the traversal of the signal path, and the control signal assigned to this value is selected.

The control signal can be used in DME transponders to set an exact transponder delay, and in DME interrogators to allow for delay variations in the distance measurement.

12 Claims, 1 Drawing Figure

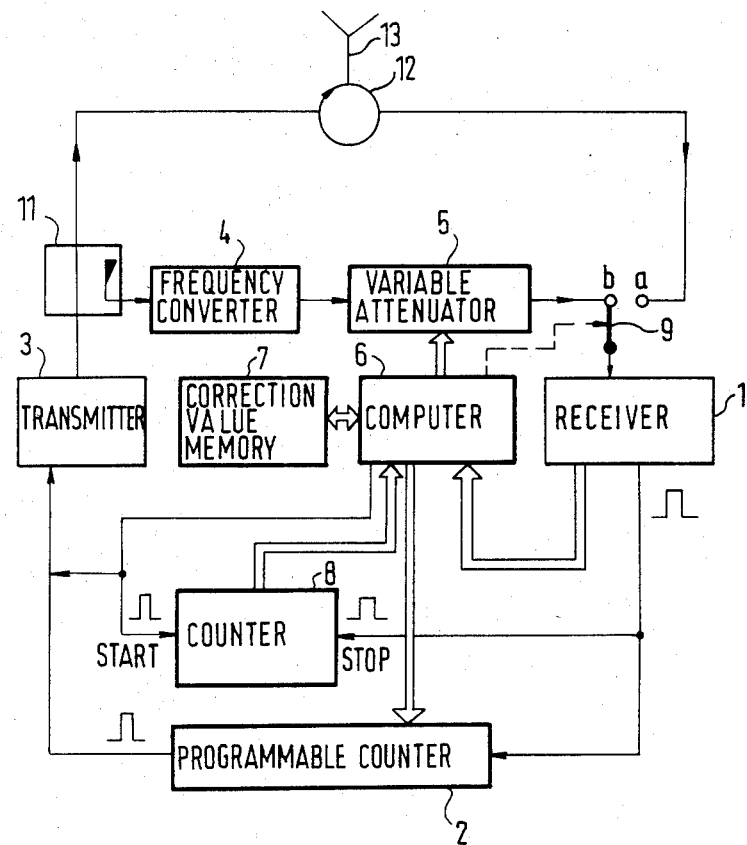

FACILITY FOR DETERMINING DELAY VARIATIONS

The present invention relates to a facility such as disclosed in DE-OS No. 24 13 995.

That Offenlegungsschrift describes the facility in connection with the DME distance-ranging system. Such a facility is useful whereever it is necessary to determine delay variations accurately.

With the prior art facility, equipment-delay variations can be determined. Such variations are caused, for example, by aging of the components used or by temperature variations.

Not covered by the prior art facility are delay variations caused by changes in the values of a signal parameter of the intelligence signals which traverse the signal path successively. One of those signal parameters is the signal amplitude. If a receiver is located at the beginning of the signal path, the delay of the intelligence signal in the receiver is dependent on the amplitude of this signal.

The object of the invention is to provide a facility for determining delay variations which also determines variations dependent on variations of the signal parameters.

The novel facility also determines delay variations caused by the fact that intelligence signals which traverse the signal path successively have different values for at least one signal parameter. Suitable signal parameters are particularly the amplitude and frequency of the signals; in the case of pulse signals, besides the amplitude, such parameters are the frequency of the carrier wave, the pulse width, and the pulse rise time.

The novel facility can be used to special advantage in the transponder or the interrogator of the DME two-way distance-ranging system.

In the transponder, the measurement accuracy depends on the exact maintenance of the 50-μs delay between the reception of interrogation pulses and the transmission of reply pulses, and it frequently happens that successively arriving interrogation pulses have greatly varying amplitudes. The control signal is used there to adjust the delay to the desired value.

In the interrogator, the time interval between the transmission of an interrogation signal and the reception of a reply signal must be precisely measured. This measurement must allow for built-in equipment delays. The control signal is used there to allow for variations of equipment delays in addition to the equipment delays themselves.

An embodiment of the invention will now be explained with reference to the accompanying drawing, whose single figure is a block diagram of the novel facility.

In the embodiment, it is assumed that only the signal amplitude is to be taken into account as a signal parameter. Consequently, only the amplitude of the signal is measured. If other parameters (instead of or in addition to the amplitude) are to be taken into account, it is only necessary to provide suitable facilities for measuring the values of these parameters. A man in the art having the below-described solution before him will be readily able to implement this.

The invention will be described as applied to a transponder for the DME two-way distance-ranging system. The drawing shows only those parts of the transponder which are necessary to understand the invention. In the DME system, an interrogation signal is received by an antenna 13 and fed through a circulator 12 into a signal path. In the signal path, a switch 9, a receiver 1, a programmable counter 2 used as a controllable delay circuit, a transmitter 3, and a directional coupler 11 are connected in series. The directional coupler 11 is connected to the circulator 12 again. To achieve high accuracy in a DME system, the time between the reception of the interrogation signal and the transmission of the reply signal must be exactly 50 μs. This delay is precisely set with the programmable counter, which counts until the resulting delay between the reception of the interrotagion signal and the transmission of the reply signal is exactly 50 μs, allowing for the built-in equipment delay.

The receiver 1 generates a trigger pulse for the programmable counter 2, which provides a trigger pulse to the transmitter 3 after reaching the preset count. This is known per se, so that devices necessary therefore will not be explained here.

The delay depends, inter alia, on variations caused by changes in equipment characteristics (temperature changes, aging of components) and on variations of the values of certain parameters of the received signal. As mentioned above, in the following description, the signal amplitude will be taken into account as the signal parameter whose value varies.

To determine the variations that cause a deviation of the delay from the nominal value of 50 μs, calibration signals are used. To produce a calibration signal, a portion of the signal provided by the transmitter 3 is coupled out in a directional coupler 11 and fed to a frequency converter 4. The frequency converter 4 is necessary in a transponder for the DME system because the frequency of the interrogation signal differs from that of the reply signal. The frequency converter changes the frequency of the reply signal provided by the transmitter 3 to the frequency of the interrogation signal fed to the receiver 1. It is followed by a variable attenuator 5, whose attenuation is varied by a controller 6; in the embodiment, this controller is implemented as a computer. The output of the attenuator 5, like the interrogation signal, is applied to the switch 9. The latter is so controlled as to apply the interrogation signal to the receiver 1 in one position, a, and the output signal of the attenuator to the receiver 1 in the other position, b. The computer 6 controls the attenuator 5 so that the calibration signals have different amplitudes. The magnitude of the amplitude steps used determines the calibration accuracy. In a practical embodiment, steps of 10 dB were chosen. Thus, in the calibration mode, the receiver 1 receives the calibration signal, not the interrogation signal. The trigger pulse provided by the receiver now stops not only the programmable counter 2 but also an additional counter 8. The counter 8 was started by a trigger pulse from the computer 6, which was also applied to the transmitter 2. This trigger pulse is provided either at regular 50-ms intervals or a given time after reception of each interrogation pulse. The counter 8 thus measures the time required for the calibration signal to pass through the transmitter, the directional coupler, the frequency converter, the attenuator, the switch, and the receiver. This measured value is transferred to the computer 6, where it is compared with the nominal value. Depending on the result of the comparison between the measured value and the nominal value, a control signal for the programmable counter is produced which is assigned to the value of the amplitude of the calibration signal being used. The data of the control signal is stored in a correction-value memory 7. The computer 6 controls the attenuator 5 so that successive calibration signals with different amplitudes are produced. Thus, for each amplitude value, the control signal assigned to this value is obtained.

To assign the correct signal to the received interrogation signal, the amplitude of the interrogation signal just received is measured in the receiver 1, and the measured value is fed to the computer 6. The computer 6 then selects in the correction-value memory 7 the control signal assigned to the amplitude of the received interrogation signal, and applies this control signal to the programmable counter 2. In this manner, not only equipment-delay variations are compensated for, but also variations caused by the fact that the interrogation signals have different amplitudes. The interrogation signals exhibit very large amplitude variations because interrogation signals are transmitted successively by interrogators located at different distances from the transponder, so they are received by the transponder successively. In the following, a few modifications of the embodiment will be given. Instead of stopping the counter 8 with the trigger pulse from the receiver 1, it is possible to stop this counter with the output signal of the programmable counter 2. The functions of the two counters 8 and 2 can also be performed by a single counter.

When putting the transponder into operation, a certain time is required until a control signal has been obtained for all suitable amplitude values. Once the control signals for all suitable amplitude values have been determined, the calibration needs to be performed only at longer time intervals.

The novel facility was described as used in a transponder. In an interrogator, it is used analogously. In the interrogator, the control signal is not used to set a constant delay as is the case in the transponder, but it is taken into account in the mathematical operations required to determine the distance.

What is claimed is:

1. A transponder for transmitting a reply signal in response to receiving an interrogation signal, said transponder comprising:
   a signal path, including:
   (a) a receiver for receiving an interrogation signal and developing a measurement signal representative of the value of a selected characteristic of said interrogation signal,
   (b) a transmitter for transmitting a reply signal in response to said interrogation signal, and
   (c) variable delay means positioned between said receiver and said transmitter for coupling said interrogation signal from said receiver to said transmitter with a time delay which, when added to other time delays in said signal path, produces a prescribed separation in time between reception of said interrogation signal and transmission of said reply signal;
   and a control unit including:
   (a) means for developing and storing a plurality of control signals, each related to a different value of said selected characteristic of said interrogation signal,
   (b) means responsive to said measurement signal for selecting from said stored control signals the one related to said value of said selected characteristic of said interrogation signal represented by said measurement signal, and
   (c) means responsive to said control signal for varying said variable delay means in accordance with said value of said selected characteristic of said interrogation signal.

2. A transponder according to claim 1 wherein:
   (a) said control unit further includes means for developing and storing a plurality of calibration signals, each representative of a different value of said selected characteristic of said interrogation signal and associated with said control signal related to the same value of said selected characteristic of said interrogation signal, and
   (b) said selecting means are jointly responsive to said measurement signal and said calibration signals for selecting said control signal associated with said calibration signal having a value of said selected characteristic of said interrogation signal corresponding to the value of said selected characteristic of said interrogation signal represented by the value of said measurement signal.

3. A transponder according to claim 2 wherein said selected characteristic of said interrogation signal is the frequency of the interrogation signal.

4. A transponder according to claim 2 wherein said interrogation signal is a pulse and said selected characteristic of said interrogation signal is the carrier frequency of the interrogation signal.

5. A transponder according to claim 2 wherein said interrogation signal is a pulse and said selected characteristic of said interrogation signal is the width of the interrogation signal.

6. A transponder according to claim 2 wherein said interrogation signal is a pulse and said selected characteristic of said interrogation signal is the rise time of the interrogation signal.

7. A transponder for transmitting a reply signal in response to receiving an interrogation signal, said transponder comprising:
   a signal path, including:
   (a) a receiver for receiving an interrogation signal and developing a measurement signal representative of the amplitude of said interrogation signal,
   (b) a transmitter for transmitting a reply signal in response to said interrogation signal, and
   (c) variable delay means positioned between said receiver and said transmitter for coupling said interrogation signal from said receiver to said transmitter with a time delay which, when added to other time delays in said signal path, produces a prescribed separation in time between reception of said interrogation signal and transmission of said reply signal;
   and a control unit including:
   (a) means for developing and storing a plurality of control signals, each related to a different amplitude of said interrogation signal,
   (b) means responsive to said measurement signal for selecting from said stored control signals the one related to said amplitude of said interrogation signal represented by said measurement signal, and
   (c) means responsive to said selected control signal for varying said variable delay means in accordance with said amplitude of said interrogation signal.

8. A transponder according to claim 7 wherein:

(a) said control unit further includes means for developing and storing a plurality of calibration signals, each representative of a different amplitude of said interrogation signal and associated with said control signal related to the same amplitude of said interrogation signal, and (b) said selecting means are jointly responsive to said measurement signal and said calibration signals for selecting said control signal associated with said calibration signal corresponding to the amplitude of said interrogation signal represented by said measurement signal.

9. A transponder for transmitting a reply signal in response to receiving an interrogation signal, said transponder comprising:

a signal path, including:

(a) a receiver for receiving an interrogation signal and developing a measurement signal having an amplitude representative of the amplitude of said interrogation signal, (b) a transmitter for transmitting a reply signal in response to said interrogation signal, and (c) variable delay means positioned between said receiver and said transmitter for coupling said interrogation signal from said receiver to said transmitter with a time delay which, when added to other time delays in said signal path, produces a prescribed separation in time between reception of said interrogation signal and transmission of said reply signal;

and a control unit including:

(a) means for developing and storing a plurality of control signals, each related to a different amplitude of said interrogation signal, (b) means responsive to said measurement signal for selecting from said stored control signals the one related to said amplitude of said interrogation signal represented by said measurement signal, and (c) means responsive to said selected control signal for varying said variable delay means in accordance with said amplitude of said interrogation signal.

10. A transponder according to claim 9 wherein:

(a) said control unit further includes means for developing and storing a plurality of calibration signals, each having an amplitude representative of a different amplitude of said interrogation signal and associated with said control signal related to the same amplitude of said interrogation signal, and (b) said selecting means are jointly responsive to said measurement signal and said calibration signals for selecting said control signal associated with said calibration signal having an amplitude corresponding to the amplitude of said interrogation signal represented by the amplitude of said measurement signal.

11. A transponder according to claim 10 wherein:

(a) said means for developing and storing said calibration signals include means for developing output signals from said transmitter and for conducting said output signals through said receiver and said transmitter at different amplitudes, thereby developing said calibration signals, and (b) said means for developing and storing said control signals include:

(1) means for measuring the time delays of said calibration signals in said receiver and said transmitter, and (2) means for developing indications of the differences between said time delay measurements and said prescribed separation in time between reception of said interrogation signal and transmission of said reply signal, thereby developing said control signals.

12. A transponder according to claim 11 wherein the frequency of said output signals from said transmitter is different from the frequency of said interogation signal and said means for developing and storing said calibration signals include means for converting the frequency of said output signals from said transmitter to the frequency of said interrogation signal.

* * * * *